Figure 1:
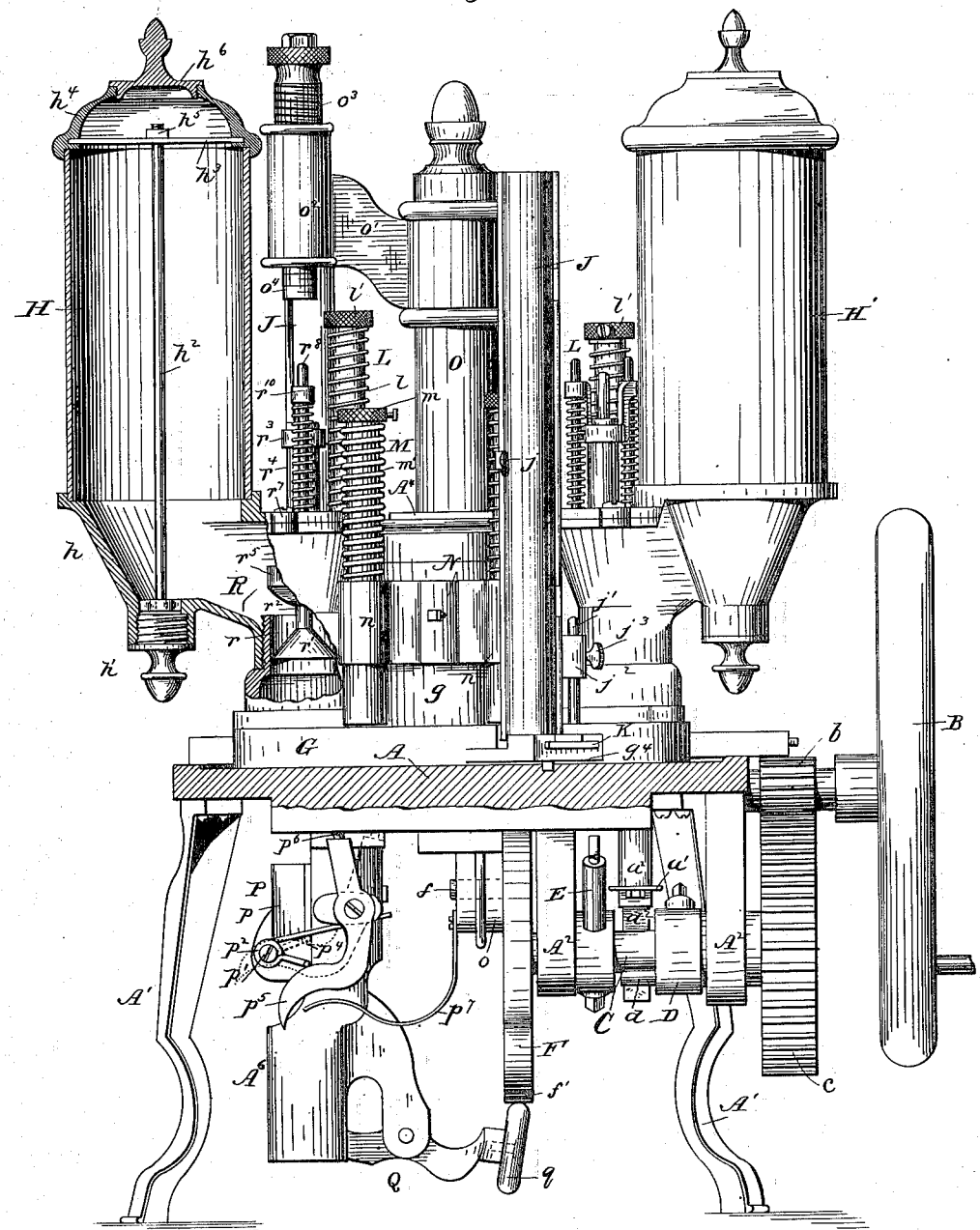

(No Model.)

5 Sheets—Sheet 1

O. KONIGSLOW.
CARTRIDGE LOADING MACHINE.

No. 321,982. Patented July 14, 1885.

Witnesses:
H. N. Low.
L. A. Conner Jr.

Inventor:
Otto Konigslow,
by Henry Calvert, atty.

(No Model.) 5 Sheets—Sheet 2.
O. KONIGSLOW.
CARTRIDGE LOADING MACHINE.
No. 321,982. Patented July 14, 1885.
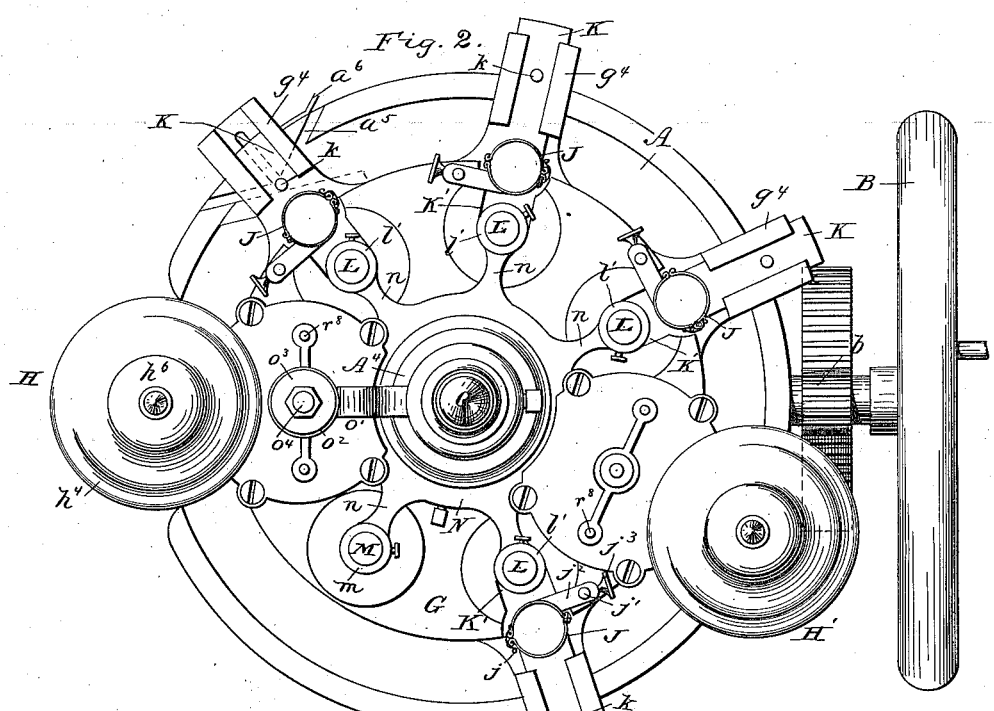
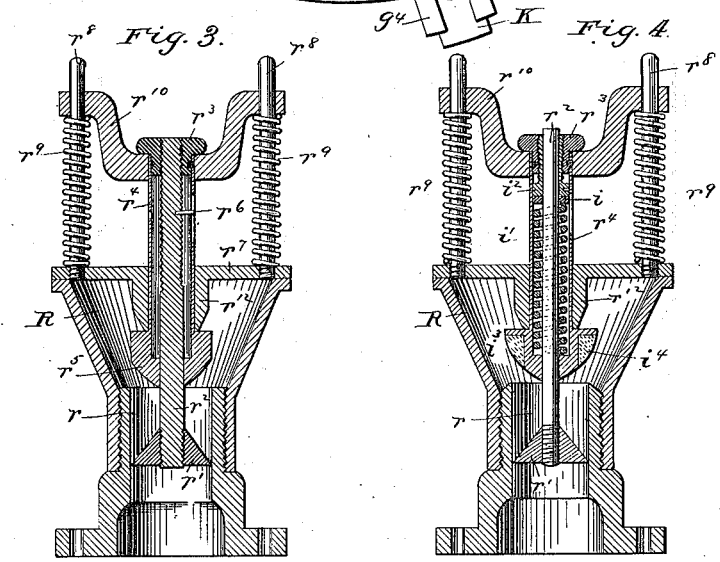
Witnesses:
Inventor:

(No Model.) 5 Sheets—Sheet 3.
O. KONIGSLOW.
CARTRIDGE LOADING MACHINE.
No. 321,982. Patented July 14, 1885.
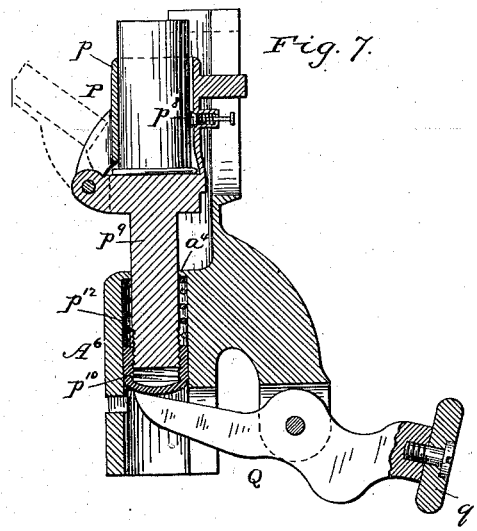
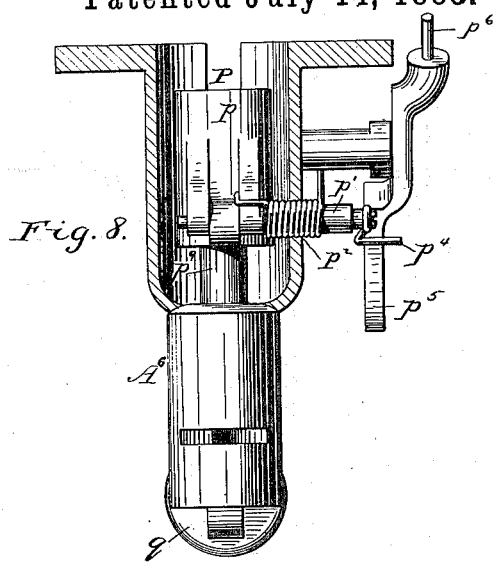
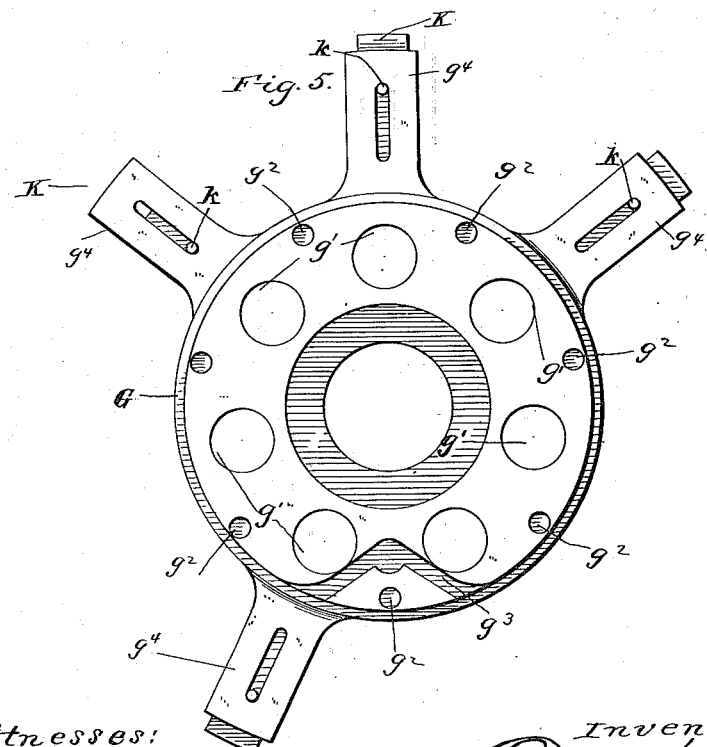
Witnesses:
H. N. Low
L. C. Conner Jr.
Inventor:
Otto Konigslow,
by Huey Calwr Atty.

(No Model.) 5 Sheets—Sheet 4.
O. KONIGSLOW.
CARTRIDGE LOADING MACHINE.
No. 321,982. Patented July 14, 1885.
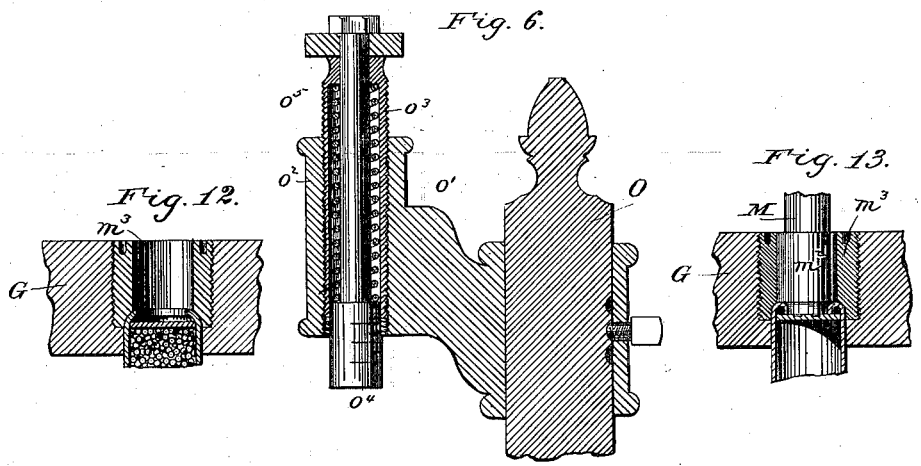
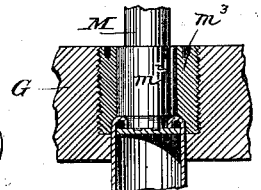
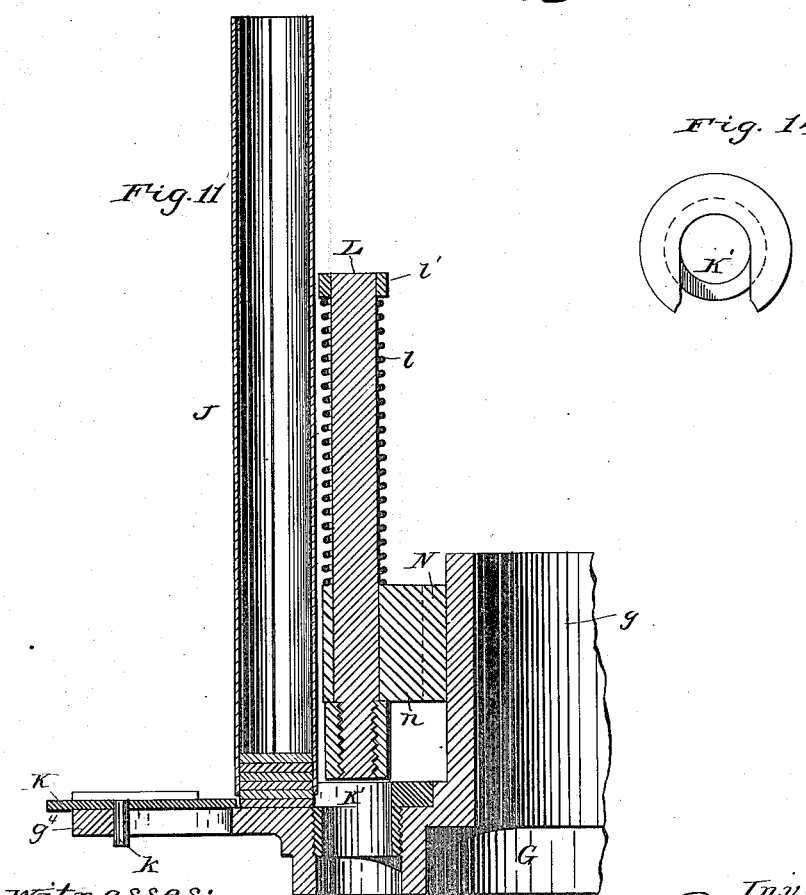
Witnesses:
Inventor:

(No Model.) 5 Sheets—Sheet 5.
O. KONIGSLOW.
CARTRIDGE LOADING MACHINE.
No. 321,982. Patented July 14, 1885.
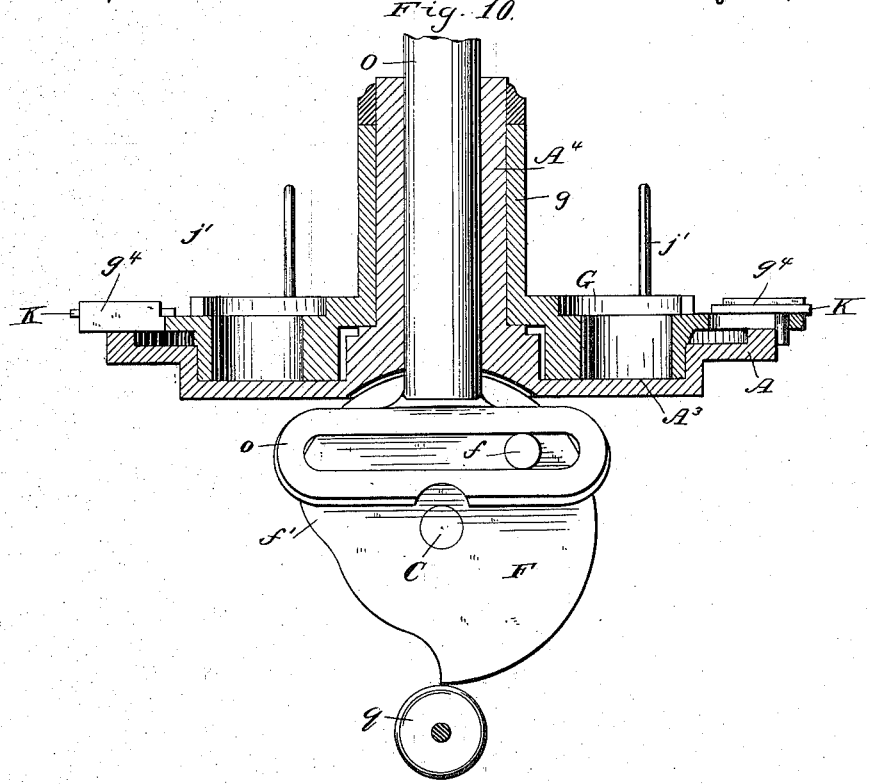
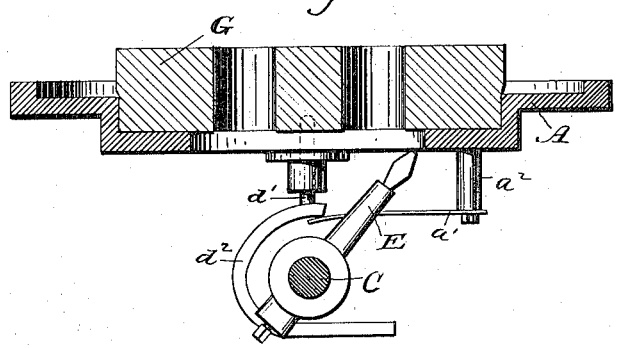

UNITED STATES PATENT OFFICE.

OTTO KONIGSLOW, OF CLEVELAND, OHIO.

CARTRIDGE-LOADING MACHINE.

SPECIFICATION forming part of Letters Patent No. 321,982, dated July 14, 1885.

Application filed November 8, 1884. (No model.)

*To all whom it may concern:*

Be it known that I, OTTO KONIGSLOW, a citizen of the United States, residing at Cleveland, in the county of Cuyahoga and State of Ohio, have invented certain new and useful Improvements in Cartridge-Loading Machines of which the following is a specification, reference being had therein to the accompanying drawings.

My invention relates more particularly to that class of cartridge-loading machines adapted for filling shells for shotguns, although some features thereof may be used in machines for loading other kinds of cartridges, the object of my invention being the production of a cartridge-loading machine which will be comparatively simple in construction, and which will perform its work in a rapid and effective manner.

To this end my machine consists, generally, of a stationary frame or table supporting the operating mechanism of the machine, the shell-holder, and a rotary table, the latter carrying the powder and shot containers and wad-holders, which pass successively over the shell-holder, so that their contents may be automatically conveyed to the shell in proper order and quantities to load the same, said rotary table carrying also crimper and marker to finish the cartridges.

In the drawings, Figure 1 is a sectional elevation of my machine. Fig. 2 is a plan view of the same. Fig. 3 is a section of the powder-measuring device, and Fig. 4 a section of the shot-measuring device. Fig. 5 is a bottom view of the rotary table. Fig. 6 is a sectional view of the pressure-head and its plunger. Fig. 7 is a sectional view of the shell-holder, and Fig. 8 a front elevation of the same. Fig. 9 is a sectional elevation showing the mechanism for rotating the movable table and the mechanism for holding said table at rest. Fig. 10 is a sectional elevation showing the vertical shaft and its operating mechanism. Fig. 11 is a section of the wad mechanism. Figs. 12 and 13 are sectional views of the crimping and marking devices. Fig. 14 is a detail plan view of the wad-guide.

A indicates a supporting-table having legs A', by which it is sustained, the said table and legs constituting the main frame-work of the machine.

Journaled on a pin or stationary shaft projecting horizontally from the table A is the driving-wheel B, and attached to or formed integral with the hub of said wheel is a pinion, $b$.

C is the main shaft, having bearings in brackets A², depending from the table A, and on the outer end of said main shaft is a gear-wheel, $c$, meshing with the pinion $b$. The shaft C carries a crank, D, having a crank-pin, $d$, a wiper-arm E, and a cam and crank-disk, F, having a crank-pin, $f$, these parts, which are attached to the said shaft, constituting the operating mechanism of the machine.

The table A is provided on its upper side with a circular recess, A³, into which fits the lower part of a rotary disk or table, G, which carries the powder and shot containers H and H' and their measuring devices, a suitable number of wad-holders, J, a wad-pusher, K, a wad-guide, K', and a wad-rammer, L, for each of said wad-holders, and a combined crimper and marker, M.

The wad-rammers and the crimper and marker are guided vertically in the arms $n$ of a spider, N, attached to or formed integral with the hub $g$ of the table G.

O is a shaft, guided vertically by a hollow post, A⁴, projecting upward from the table A, said shaft having at its lower end a slotted yoke, $o$, in which the crank-pin $f$ of the disk F works, said pin thus imparting vertical movements to said shaft when the machine is in motion.

To the vertically-reciprocating shaft O, near its upper end, is attached an arm or pressure-head, $o'$, the outer end, $o²$, of which is cylindrical, and is threaded internally for the reception of a hollow screw, $o³$. Inside of the screw $o³$ is arranged a plunger, $o⁴$, around the stem of which is coiled a stiff spring, $o⁵$, forming a yielding connection between said plunger and the cylinder $o²$. The plunger being thus carried by the screw is vertically adjustable in the cylinder $o²$, for the purpose of varying the pressure on the wads, as will be explained, said plunger being provided with a graduated scale for convenience in setting in any desired position.

The table G is intermittingly rotated by the wiper-arm E, working through a slot, $a$, in the table A, said arm engaging the rotary table G by means of the circular openings $g'$ therein, through which the powder, shot, wad-rammers, and crimper and marker pass. The table G is held positively after each movement by the pin $d'$, working through the table A, and engaging in holes $g^2$ in the table G. The pin $d'$ is carried by a yoke, $d^2$, which is forced downward by the crank-pin $d$ at proper intervals to withdraw the pin $d'$ from the table G, when the latter is to be rotated, the upward movements of said yoke being imparted thereto by the spring $a'$, connected by a depending stud, $a^2$, with the table A.

A hanger, $A^6$, attached to or formed integral with the table A, serves to sustain the shell-holder P and its operating mechanism. The said shell-holder consists of a hollow cylindrical receptacle or cup formed in two parts, one of which is hinged to the other by a pin passing through lugs in both parts. The hinged part or door $p$ of the said holder is provided with an arm, $p'$, around which is coiled a torsional spring, $p^2$, normally holding the movable part or door of the holder against the other part thereof, and secured to said arm is a crank, $p^4$, which, when the cartridge is completed, is acted on by the lower arm of a lever, $p^5$, to throw the hinged part of the holder outward, as indicated in dotted lines in Fig. 7, thus permitting the cartridge to be removed from the holder. On the upper arm of the lever $p^5$ is a pin, $p^6$, which passes upward through a slot in the table A and engages a cam-track, $g^3$, in the rotary table G, a spring, $p^7$, attached to the vertically-moving yoke $o$, assisting, by pressing against the lower arm of said lever at the proper time, to insure the engagement of said pin with said cam-track, which latter forces the top of the lever inward, as indicated by dotted lines in Fig. 1, to open the holder, and when the latter is thus opened the cartridge may be removed therefrom by one or more spring-acted pushers, as $p^8$, or otherwise. The said shell-holder P has a shank or stock, $p^9$, by which said holder is guided vertically in the hanger $A^6$, the said stock having at its lower end an adjustable nut or thimble, $p^{10}$, the position of which may be changed to vary the working-length of said stock, and against which impinges one arm of a lever, Q, the other arm of said lever having a roller, $q$, working in contact with the peripheral cam $f'$ on the disk F. As the said disk revolves, intermittent vertical movements will be imparted to the holder P, the downward movements thereof being insured by a spring, $p^{12}$, placed between the thimble $p^{10}$ and an annular lip, $a^4$, on the hanger $A^6$.

The wad-holders J each consist, preferably, of a tube formed in two parts, one of which is hinged to the other, the two parts being held together by a spring-clip, as $j$, or other suitable fastening. This construction permits the holders to be readily filled with wads when they are opened, and when closed the wads are securely but loosely held in position to be properly fed to the cartridges.

The number of the wad-holders may be varied according to the class of cartridges to be filled. In the present instance I have shown three wad-holders between the powder and shot reservoirs; but it is obvious that if it is not desired to put so many wads in the cartridge between the powder and shot the wads may be omitted from one or more of these holders; or the machine may be constructed with a lesser number of holders.

Each of the wad-holders J is supported on the rotary table G by a pin, $j'$, passing through an arm or lug, $j^2$, on the holder, a thumb-screw, $j^3$, securing the lug to the pin. The said holders are placed between the wad-pushers and wad-guides with their lower ends a sufficient distance above the arms $g^4$, which form the ways for the wad-pushers, to permit the wads to slide easily between the upper surfaces of said arms and the lower ends of said holders. To accommodate wads of different thicknesses, the holders may be adjusted vertically on the pins $j'$ when the thumb-screws $j^3$ are loosened, after which the screws will again be tightened to secure the holders in place.

The wad-pushers K are guided in ways in the radial arms $g^4$ of the table G, each pusher being provided with a pin, $k$, projecting downward through a slot in its guiding-arm $g^4$. When the pushers are drawn out, the pins $k$ are outside of the periphery of the table A, and the pushers are moved inward and then again outward at the proper moment, as the wad-holders are approaching the cartridge-holder, by a stationary cam or cam-track, $a^5$, on the table A, the initial inward movements of the said pushers being in the present instance effected by an inclined projection or switch, $a^6$, extending beyond the periphery of the table A. The inward movement of a wad-pusher forces the wad lying in its path into the adjacent wad-guide K' in the table G, each of the said wad-guides having an outwardly-open slot for the passage of the wads, which fit closely into the said guides, and are thus held in place over the vertical wad-passages thereof in readiness to be forced down at the proper time into the shell by the wad-rammers.

The wad-rammers L are carried by and reciprocate vertically in the arm $n$ of a spider, N, the upward movements of said rammers being effected by coiled springs $l$, placed between said arms and collars $l'$, at or near the tops of the rammers, the downward movements of the latter being produced by the plunger $o^4$, as will be explained. Each of the rammers is preferably formed in two parts, having an adjustable screw-connection, as shown in Fig. 11, so that the rammers may be lengthened or shortened at pleasure by screwing one part out of or into the other, the lower parts being of sufficient size to serve as stops, coming in contact with the under sides of the arms $n$ to limit the upward movements of the rammers. It will be understood that the rammers L are of different lengths, the one next the powder-container being the longest, and the others being successively shorter.

The powder-container H consists, preferably, of a glass cylinder supported on a metallic cup, $h$, the bottom of which is partly open, and the openings being closed by a screw-plug, $h'$. To the bottom of the cup $h$ is attached a rod, $h^2$, which passes through a cross-bar, $h^3$, secured to or formed integral with the cover $h^4$ of the glass cylinder, said rod being threaded at its top for the reception of a nut, $h^5$, by which the cover is fastened, a removable plug, $h^6$, permitting access to said nut and to the cylinder when the latter is to be filled. The cup $h$ opens into the material-holding hopper R, screwed to a measuring-cylinder, $r$, the latter being fastened to the rotary table G. The cylinder $r$ has an interior enlargement at its bottom, and a conical measuring-plunger, $r'$, fitting the upper or smaller interior portion of the said cylinder, is arranged to reciprocate therein, said plunger having a stem, $r^2$, the top of which is threaded for engagement with a thumb-nut, $r^3$, fastened to but turning in a tube, $r^4$, carrying at its lower end a downwardly-tapering or conical measuring-valve, $r^5$, the larger cylindrical part of which just fits in the smaller interior portion of the cylinder $r$. The stem $r^2$ is provided with an index-pin, $r^6$, and the tube $r^4$ with a slot, in which said pin can move, said tube being also preferably provided on its outer surface with a graduated scale. By turning the nut $r^3$, the plunger $r'$ may be raised or lowered relative to the valve $r^5$ to vary the space between said plunger and valve, and thus regulate the amount of material to be measured at each operation.

Secured to the cylinder R is a cover, $r^7$, provided with small standards $r^8$, on which are placed coiled springs $r^9$. A cross-head, $r^{10}$, to which the tube $r^4$ is attached, is guided vertically by said standards, said springs being adapted to raise said cross-head by being placed beneath the outer ends of the same. As the measuring devices are connected with the said tube, they will move therewith, the upward movements of the said devices and tube being limited by a boss, $r^{12}$, on the under side of the cover $r^7$, against which boss the valve $r^5$ impinges on its upward movement.

When the parts of the automatic powder-measure just above described are in the position indicated by Fig. 3, and the powder-container H is supplied with powder, the latter will run into the hopper and fill the space between the measuring-plunger $r'$ and the valve $r^5$, and when in the operation of my machine, the measuring-cylinder $r$ comes into position above the shell-holder and the shell therein, the tube $r^4$ will be centrally beneath the plunger $o^4$, connected with the vertically-reciprocating shaft O. As said shaft descends, the plunger $o^4$, impinging against the nut $r^3$, will force the measuring devices downward, the tapering lower end of the valve $r^5$ permitting its easy descent through the powder in the bottom of the hopper. As soon as the cylindrical or larger part of the valve $r^5$ enters the cylinder $r$, the top of said cylinder will be closed, so that no more powder cannot enter the measuring-space, which will then be entirely within said cylinder. The measuring devices will continue their downward movement until the plunger $r'$ enters the enlarged interior of the cylinder, when the powder will quickly slide down the conical surface thereof and into the shell below. As the plunger $o^4$ rises, the springs $r^9$ will raise the tube $r^4$ and the measuring devices connected therewith until they are stopped by the contact of the top of the valve $r^5$ with the boss $r^{12}$, as above indicated. In this upward movement of the measuring devices the valve $r^5$ will fill the upper or smaller interior part of the measuring-cylinder until the plunger $r'$ rises above the enlarged interior lower portion thereof.

The shot-container H', its connected hopper, and the measuring-cylinder, by which the latter is attached to the table G, are the same in construction as the similar parts of the powder apparatus above described, as are also the measuring-plunger, the tube, and some other parts, all of which are lettered the same as the corresponding parts of the powder-measuring mechanism, the foregoing description of which will apply to the shot-measuring mechanism, and need not, therefore, be repeated; but the latter mechanism differs from the former in certain particulars, which I will now indicate.

The stem $r^2$ of the shot-plunger $r'$ is provided with a flange, $i$, below which, in the tube $r^4$, is placed a strong spiral spring, $i'$, the normal stress of which against said collar is rather greater than the stress of both of the springs $r^9$ against the arms of the cross-head $r^{10}$. The thumb-nut $r^3$ is not connected with the plunger-stem, as in the powder-measure, but engages with a collar, $i^2$, the head of which impinges against the flange $i$ on the plunger-stem. By means of this construction, the plunger may be raised or lowered relative to the valve $i^3$ to vary the measuring-space, as in the shot-measure. The valve $i^3$ is tapering or conical at its lower end, and its upper end is somewhat larger than the upper part of the aperture in the measuring-cylinder $r$, the portion of said valve which is to come in contact with the seat formed by the top of said measuring-cylinder being preferably formed by a rubber ring, $i^4$, encircling the metallic body of the valve. The spring $i'$ forms a yielding connection between the tube $r^4$ and plunger-stem, so that the latter can move independently of the former.

When in the operation of my machine the shot-measure comes over the shell-holder and shell, the vertically-reciprocating plunger $o^4$ will descend and press against the plunger-stem $r^2$, and, compressing the light springs $r^9$, will force the cross-head $r^{10}$, tube $r^4$, and valve $i^3$ downward with the plunger $r'$ until the measuring-cylinder $r$ is closed by the contact of the valve $i^3$ with the top of said cylinder.

As the plunger $o^4$ continues its descent, the spring $i'$ under the flange $i$ will yield, permitting the farther descent of the plunger $r'$ into the enlarged lower portion of the measuring-cylinder $r$, when the shot will be free to escape into the shell below. When the plunger $o^4$ rises, the valve will be held in contact with the measuring-cylinder by the spring $i'$ until the plunger $r'$ rises above the enlarged lower part of the measuring-cylinder.

The combined crimper and marker comprises a stock or rod, M, adapted to reciprocate vertically in one of the arms $n$ of the spider N, said rod having at its top a collar, $m$, between which and said arm is placed a spiral spring, $m'$, for raising said rod after it has been depressed and for holding it up.

To the lower end of the rod M is adjustably attached a crimping and marking plunger, $m^2$, said plunger preferably having its lower corner chamfered off, as shown, (see Fig. 13,) and being provided on its lower face with raised or sunken letters or characters, which will be impressed on the top wad of the cartridge simultaneously with the operation of crimping the shell.

Attached to the table G, and centrally arranged below the rod M, is a ring, $m^3$, which forms part of the crimper, said ring being screwed into said table so that it may be adjusted vertically therein to accommodate cartridges of different lengths, the crimping and marking plunger $m^2$ being adjustably attached to the rod M in a similar way and for the same purpose. The ring $m^3$ is provided at its lower end, on its inner side, with an inclined or curved annular recess for turning in the top edges of the cartridges. As the cartridge is finished by the crimping and marking devices, they may collectively be termed "cartridge-finishing devices."

The operation of my machine will be readily understood from the foregoing description. The parts being in the position indicated in Fig. 1, with the powder-measure over the shell-holder (the latter being supposed to contain a shell) the rotation of the driving-wheel and main shaft will cause the peripheral cam $f'$ on the disk F, acting on the roller carried by the lever Q, to operate said lever to raise the shell-holder, thus lifting the shell closely up against the measuring-cylinder, and as the shaft O moves downward at the same time, the plunger $o^4$ will operate the powder-measure, in the manner hereinbefore described, to permit a proper quantity of powder to descend into the shell. As the shaft O rises, the shell-holder descends and the crank-pin $d$ comes in contact with the lower arm of the yoke $d^2$, forcing the said yoke downward, and withdrawing the pin $d'$ from engagement with the rotary table G. The wiper-arm E next engages the said table by one of the openings $g'$, giving said table a partial rotation, thus bringing one of the wad-rammers and wad-guides over the shell-holder, a wad having been just previously forced into the wad-guide by its wad-pusher in the manner hereinbefore described. The shell-holder again moves upward close against the wad-starter, and the rammer descends under the action of the plunger $o^4$, forcing the wad into the shell. Thus the operation continues for the other wad-operating devices as the table is intermittingly rotated, the shot-measuring device, automatically operated, as hereinbefore described, dropping the proper quantity of shot into the cartridge-shell, in due order, and another wad being forced down onto the shot by the last of the series of wad-rammers. Another forward movement of the rotary table brings the crimping and marking mechanism into position to finish the cartridge. As the shell-holder moves upward, (as it does at each rotation of the driving-shaft,) the upper edge of the filled shell is forced against the recessed lower end of the crimping-ring $m^3$, turning the upper edge of said shell inward, as indicated in Fig. 12. The crimping and marking plunger $m^2$ next descends, forcing down the inwardly-turned edge of the shell and at the same time impressing its stamp on the top wad of the cartridge. At the next forward movement of the table G to bring the powder-measure again into operative position, the cam-track $g^3$ on said table engages the pin $p^6$ on the upper arm of the lever $p^5$, forcing the lower arm thereof against the crank $p^3$, and moving outward or opening the movable part or door $p$ of the holder, when the cartridge will be quickly forced therefrom by the pushers $p^8$, or otherwise, and another shell having been placed in the holder, the machine is in readiness to repeat the above-described operation.

The plunger $o^4$, having a yielding connection with its carrying-arm or pressure-head, will, after it has forced a wad home to its place, cease its downward movement, thereby permitting the shaft to move downward independently of the said plunger, pressing the latter down on the wad. It will be thus obvious that the pressure on the wads or the tightness with which the cartridges are packed may be varied simply by adjusting the plunger relative to its carrying-arm.

I am aware of Patent No. 295,980, to F. L. Chamberlin, and I do not wish to be understood as claiming anything therein shown, but

What I claim is—

1. In a cartridge-filling machine, the combination, with a stationary frame-work or table, and a non-rotating shell-holder sustained thereby, of an intermittingly-rotating table and a series of shell-filling appliances carried by said rotating table, whereby said shell-filling appliances are adapted to pass successively over said shell-holder, substantially as set forth.

2. In a cartridge-filling machine, the combination, with a stationary frame-work or table, and a vertically-reciprocating shell-holder sustained thereby, of an intermittingly-rotating table and a series of shell-filling appliances carried by the said rotating table, substantially as set forth.

3. In a cartridge-filling machine, the combination, with a stationary table having a central post or hub and a non-rotating shell-holder sustained by said table, of a rotary table pivoted on said post and a series of shell-filling and cartridge-finishing devices carried by said rotary table, substantially as set forth.

4. In a cartridge-filling machine, the combination, with a stationary frame-work or table and a rotary table mounted thereon, of a vertically-reciprocating shaft, a plunger or pressing device connected with said shaft, and a series of shell-filling appliances carried by said rotary table, and thus coming successively beneath said plunger to be depressed thereby, substantially as set forth.

5. In a cartridge-filling machine, the combination, with a stationary frame-work or table and a rotary table mounted thereon, and provided with a series of shell-filling appliances, of a vertically-reciprocating shaft having an arm or pressure-head and a pressing-plunger adjustably secured to said arm or pressure-head, substantially as set forth.

6. In a cartridge-filling machine, the combination, with a stationary frame-work or table, a rotary table mounted thereon, and a series of shell-filling appliances carried by said rotary table, of a vertically-reciprocating shaft having an arm or pressure-head and a pressing-plunger having a yielding connection with said arm or pressure-head, substantially as set forth.

7. In a cartridge-filling machine, the combination, with a vertically-reciprocating shaft having an arm or pressure-head, of a pressing-plunger adjustably secured to said arm or pressure-head, said plunger having a graduated scale for convenience in setting the same, substantially as set forth.

8. In a cartridge-filling machine, the combination, with a vertically-reciprocating shaft carrying an arm or pressure-head having an internally-threaded socket or cylindrical portion at its outer end, of a hollow screw fitted to said socket, a plunger carried by said screw, and a spring forming a yielding connection between the plunger and screw, substantially as set forth.

9. In a cartridge-filling machine, the combination, with a stationary frame-work or table and a rotary table mounted thereon and having a hub, of a spider secured to said hub, and having a series of arms, and a series of wad-rammers and a crimping-plunger guided vertically by said arms, substantially as set forth.

10. In a cartridge-filling machine, the combination, with the stationary frame-work or table and a rotary table mounted thereon, and having a series of openings for the passage of the shell-filling material and the crimping-plunger, of a driving-shaft carrying a wiper-arm engaging said rotary table by said openings to move the same intermittingly forward, a crank-pin connected with said shaft, and a spring-acted yoke having a pin engaging said rotary table to hold the same stationary after each forward movement thereof, substantially as set forth.

11. In a cartridge-filling machine, the combination, with a stationary and a rotary table, the former having a central hollow post on which the latter revolves, of a vertically-reciprocating shaft fitting in said hollow post, and having at its lower end a yoke and a driving-shaft having a crank-disk carrying a crank-pin working in said yoke to operate said shaft, substantially as set forth.

12. In a cartridge-filling machine, a tubular wad-holder formed in two parts, one of which is hinged to the other, combined with a spring-fastening device for holding said parts together when closed, substantially as set forth.

13. In a cartridge-filling machine, a wad-holder combined with a support, on which said holder is vertically adjustable, and a fastening device, as a set-screw, for securing said holder in any position to which it may be adjusted, substantially as set forth.

14. In a cartridge-filling machine, the combination, with a stationary table, provided with a cam-track, a rotary table having a series of wad-rammers and wad-starters, and also a series of radially-projecting arms, of a series of wad-pushers guided in ways in said arms and having pins engaging said cam-track, substantially as set forth.

15. In a cartridge-filling machine, the combination, with a frame or table having a depending bracket or hanger, of a shell-holder guided vertically in said hanger, a spring and lever for operating said shell-holder, and a driving-shaft having a cam for operating said lever, substantially as set forth.

16. In a cartridge-filling machine, a vertically-reciprocating shell-holder having a shank or stock, combined with an adjustable nut or thimble for varying the working length of said stock, substantially as set forth.

17. In a cartridge-filling machine, a shell-holder formed in two parts, one of which is hinged to the other, combined with a spring for automatically closing the hinged part and with mechanism for automatically opening the same at the proper moment, substantially as set forth.

18. In a cartridge-filling machine, the combination, with a stationary and a rotary table, of a shell-holder supported by the former and constructed in two parts, one of which is hinged to the other, a spring for closing the hinged part or door, a crank for opening the same, a lever for operating said crank, and a cam-track on said rotary table for operating said lever, substantially as set forth.

19. In a cartridge-filling machine, the combination, with a shell-holder formed in two parts, one of which is hinged to the other, of one or more spring-acted pushers for ejecting the finished cartridge from the holder when the hinged part or door thereof is opened, substantially as set forth.

20. In a cartridge-filling machine, the combination, with a vertically-movable shell-holder, of a crimping-ring having an annular recess on its inside at its lower end, and a vertically-movable crimping-plunger reciprocating in said ring, substantially as set forth.

21. In a cartridge-filling machine, a reciprocating crimping-plunger provided on its lower face with marking-characters, whereby it is adapted to serve as a combined crimper and marker, substantially as set forth.

22. In a cartridge-filling machine, the combination, with a shell-holder, of a vertically-reciprocating crimping-ring, which is adjustable in the part by which it is carried toward or from said shell-holder, substantially as set forth.

23. In a cartridge-filling machine, the combination, with a shell-holder and an adjustable crimping-ring, of a crimping-plunger reciprocating in said ring, and a stock or rod to which said plunger is adjustably but rigidly connected, substantially as set forth.

24. In a cartridge-filling machine, an automatic measuring device, consisting of the combination, with a measuring-ring having an interior enlargement at its lower end on its inner side, of a reciprocating plunger fitting the smaller interior part of said ring and a reciprocating valve constructed to close the top thereof when said plunger descends into the enlarged interior part of said ring, substantially as set forth.

25. In a cartridge-filling machine, the combination, with a material-hopper and a measuring-ring having an interior enlargement at its lower end, of a plunger fitting the smaller interior part of said ring and a valve constructed to close the top thereof, said plunger being adjustable toward or from the said valve, for the purpose of varying the measuring-space between them, substantially as set forth.

26. In a cartridge-filling machine, the combination, with the measuring-plunger and its stem, of a tube provided with a valve and an adjusting-nut attached to but turning in said tube, for varying the position of said plunger relative to said valve, substantially as set forth.

27. In a cartridge-filling machine, the combination, with the material-hopper and its cover and standards attached to the latter, of a plunger, valve, tube, and cross-head, these four parts being connected together, and springs for raising said cross-head and its connected parts after they have been depressed, substantially as set forth.

28. In a cartridge-filling machine, the combination, with the measuring-valve and its carrying-tube, the latter being provided on its exterior with a graduated scale, of a measuring-plunger which is adjustable toward or from said valve, said plunger having a stem provided with an index-pin, substantially as set forth.

29. In a cartridge-filling machine, the combination, with a reciprocating measuring-plunger and its stem, of a tube with which said stem is loosely connected, a measuring-valve carried by said tube, and a spring arranged in the interior of the tube and serving as a yielding connection between the latter and the plunger-stem, thus permitting the plunger to reciprocate independently of the valve, substantially as set forth.

30. In a cartridge-filling machine, the combination, with a reciprocating measuring-valve, of a reciprocating measuring-plunger having a yielding connection with the said valve, whereby said plunger is adapted to move independently of said valve, substantially as set forth.

31. In a cartridge-filling machine, the combination, with the measuring-ring and the material-hopper, of a measuring-plunger having a stem provided with a flange, a tube carrying a measuring-valve, a spring arranged within said tube beneath said flange, a collar against which said flange abuts, a nut for holding said collar in said tube, a cross-head connected with the latter, and springs having lesser strength collectively than the said spring in said tube for raising said cross-head, substantially as set forth.

In testimony whereof I affix my signature in presence of two witnesses.

OTTO KONIGSLOW.

Witnesses:
 ERNST KONIGSLOW,
 LOUIS E. WEBER.